United States Patent [19]
Yarrington

[11] 3,782,506
[45] Jan. 1, 1974

[54] MECHANICAL MOTION RETARDING MEANS

[75] Inventor: James Clifford Yarrington, Endicott, N.Y.

[73] Assignee: International Business Machines Corporation, Armonk, N.Y.

[22] Filed: May 30, 1972

[21] Appl. No.: 257,592

[52] U.S. Cl. .................. 188/1 B, 74/574, 220/22.4
[51] Int. Cl. ............................................. F16f 7/10
[58] Field of Search ............... 74/574; 188/1 B, 188/130; 220/22.2, 22.4, 22.5, 22.6; 312/190

[56] References Cited
UNITED STATES PATENTS

| | | | |
|---|---|---|---|
| 3,085,657 | 4/1963 | Preis | 188/1 B |
| 3,259,212 | 7/1966 | Nishioka et al. | 188/1 B |
| 3,001,419 | 9/1961 | Hymans et al. | 74/574 |
| 903,368 | 11/1908 | Flanders | 220/22.2 |
| 2,800,026 | 7/1957 | Kurzina | 74/574 X |

Primary Examiner—Duane A. Reger
Attorney—P. M. Brannen et al.

[57] ABSTRACT

Inertial retardation of mechanical motion is obtained by coupling an inertia element, which is relatively massive, to a mechanical load device, by a unidirectional coupling means, arranged so that the load device is effectively connected to the inertia element during the time that its motion is to be retarded. At the termination of the motion of the load device, by some arresting means, the inertia element is effectively uncoupled, and the stored energy in the inertia element is suitably dissipated. The load device is accordingly stopped with an arresting impulse equal only to the reduced momentum of the load.

A preferred embodiment of the invention comprises a relatively massive flywheel coupled to the load device via an over-running clutch.

9 Claims, 2 Drawing Figures

PATENTED JAN 1 1974                     3,782,506 ic 3,782,506

MECHANICAL MOTION RETARDING MEANS

FIELD OF THE INVENTION

This invention relates to mechanical motion elements, and particularly to means for damping or retarding a mechanical movement, by coupling an inertia element having a large amount of inertia to the movement to be retarded, by means of an over-running mechanical coupling means.

DESCRIPTION OF THE PRIOR ART

Various mechanical retarding or damping devices such as dashpots, rotating fans or air vanes are known in the art for retarding or damping mechanical motion. However, most of these devices are relatively expensive, or are unsuited for retarding the motion of a mechanical element in one direction.

SUMMARY OF THE INVENTION

It is a principal object of the present invention to provide an improved retarding means for retarding or damping mechanical movement.

A further object of the invention is to provide an improved mechanical motion retarding means employing a relatively massive inertia element coupled by unidirectional coupling means to a mechanical load device, the motion of which is to be retarded in a given direction.

Another object of the invention is to provide an improved retarding means for mechanical movement using the rotational inertia of a clutch-coupled flywheel.

A further object of the invention is to provide an improved retarding means for mechanical movement using a flywheel coupled by an over-running clutch to the device to be retarded.

Other objects of the invention and features of novelty and advantages thereof will become apparent from the detailed description to follow, taken in connection with the accompanying drawings.

In practicing the invention, the mechanical load device, the motion of which is to be retarded, is coupled to an inertia element, which has a relatively high inertia, through a unidirectional coupling means, which effectively transmits motion in a single direction, in this case the direction corresponding to the direction of motion of the load device, when retardation is to be effective. The motion of the load device must move the inertia element, and this inertia will provide the required retardation. At the end of travel of the load device, its motion is halted, by some arresting means or object, and the inertia element is free to continue its motion, by virtue of the unidirectional coupling device. The inertia element is brought to a stop either by ordinary friction of its supporting elements, or by suitable energy absorbing means, to thereby dissipate the unneeded kinetic energy.

In one form of the invention, the mechanical movement to be retarded is appropriately coupled to cause rotation of a shaft in a predetermined direction when retardation is to be accomplished. Coupled to this shaft by an over-running clutch is a relatively massive flywheel. The device or motion to be retarded must drive the flywheel, and the inertia of the flywheel will cause the required retardation. At the end of the retarded movement, the flywheel will be revolving, with a certain amount of kinetic energy taken from the retarded device. The over-running clutch allows the flywheel to continue rotating and coast to a stop, thereby dissipating the unneeded energy.

GENERAL DESCRIPTION OF THE DRAWINGS

FIG. 1 of the drawings is a diagrammatic illustration of a first embodiment of the invention, in which the motion of all elements is rectilinear.

FIG. 2 is a diagrammatic representation of a retarding device according to the invention, as applied to a document stacking mechanism.

DETAILED DESCRIPTION

Figure 1:
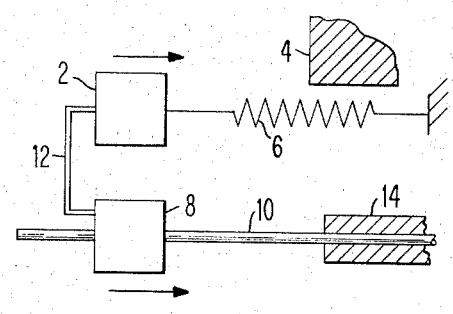

Referring to FIG. 1 of the drawings, there is shown a mechanical load device 2, supported and guided by means not shown, to move linearly from the position shown to a position abutting the stop element 4. The motion of the device 2 is powered by any suitable means, such as the spring 6. An inertia element 8, which comprises a relatively massive weight, is arranged to travel parallel to the load device 2, supported and guided by any suitable means, such as the rod 10. Fixed to the load device 2 is a unidirectional coupling device 12, comprising a U-shaped element, one end of which is fixedly attached to device 2, and the other end of which engages the rear end of the inertia element 8.

It will be apparent that as device 2 moves to the right, it will be forced to accelerate the mass 8, thereby retarding the motion of 2. However, when device 2 is halted at the stop element 4, the inertia element 8 is free to continue its motion until it encounters the energy dissipating means 14, which will absorb the excess energy and halt the element 8.

It will be seen that prior to each operation of the device 2, the inertia element must also be reset to its initial position as shown, by any suitable means.

Figure 2:
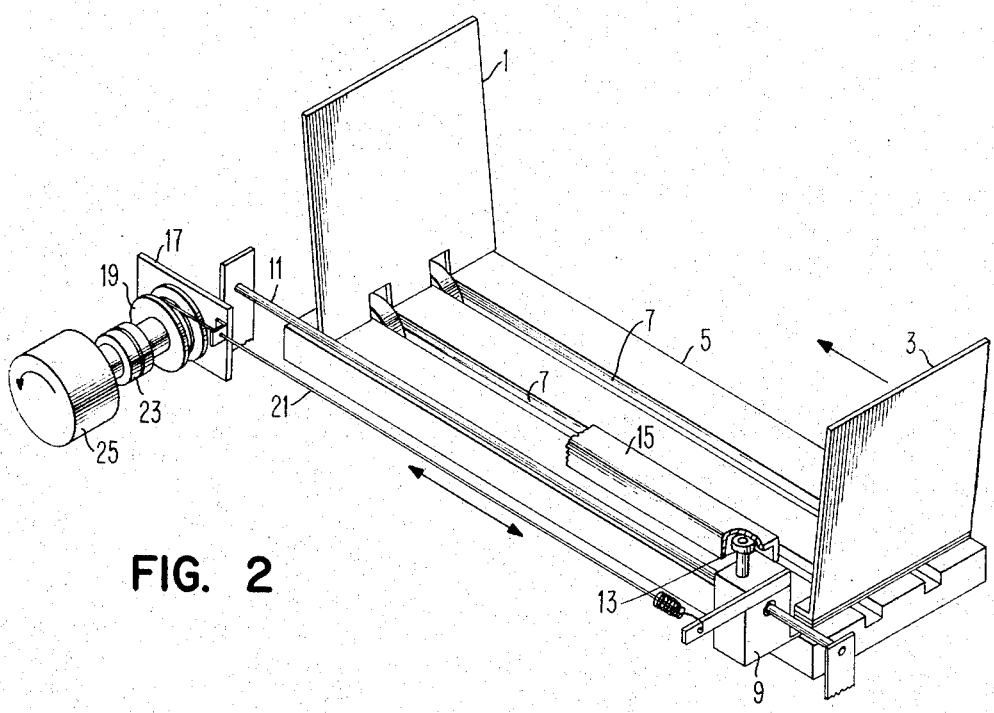

Referring now to FIG. 2 of the drawings, there is shown, in diagrammatic form, a portion of a document stacking device, which utilizes a preferred form of the present invention to provide retardation or damping of one portion of the mechanism shown.

Documents are delivered in a substantially vertical direction to the stacker at a stacker backing plate 1, and as the documents continue to be delivered, they build up in a stack which is retained by the pressure of a movable plate 3, which is urged against the stack by spring pressure. Plate 3 rides on the bed plate 5 including grooves 7, and is carried by a carriage 9 which has an extension fastened to plate 3. Carriage 9 rides on a rod 11, so that it can move to and fro as shown by the two-headed arrow. Carriage 9 is further guided and retained in its proper path by a roller 13 pivotally attached to the top of the carriage and riding in a stationary guide member or channel 15.

Mounted on another stationary support or plate 17 is a conventional "negator" or spring motor 19. The rim of negator or motor 19 is provided with a pulley-type surface, on which is wound a cable 21, the other end of which is connected through a small wire hook, to the carriage 9. Negator 19 is arranged in the usual fashion to provide a spring return force tending to rotate the negator in a counter-clockwise direction as viewed in the drawing. This force accordingly urges plate 3 toward the left to hold it against the stack of documents.

When the machine operator removes a portion or all of the stack of documents after the stacker has accumulated a stack of sufficient size, the spring motor 19 will rotate counterclockwise, thereby winding the cable 21 and pulling the carriage 9 and plate 3 to the left. If no retarding action were provided, the carriage 9 and plate 3 would be accelerated to the point where the impact force when plate 3 would reach the end of its travel against the remaining documents would be undesirable, particularly from the standpoint of maintaining proper stacker performance with the continuance of incoming documents. Thus it is preferable to provide suitable retarding means for reducing the acceleration of the plate 3 and carriage 9.

This retardation is provided, according to the instant invention, by coupling the shaft of the spring motor 19, via a one-way or over-running clutch 23, to a relatively massive flywheel 25.

The clutch is selected and arranged so that the motion of the load to be damped or retarded is coupled to the flywheel to drive it when the motion is to be retarded. In the present case, the clutch is arranged so that the flywheel is driven by the spring motor when the motor is pulling plate 3 and carriage 9 to the left.

It will be apparent that with the relatively large effective mass coupled to the load represented by the plate 3 and carriage 9, the combined load will not accelerate as rapidly as if the flywheel were not provided.

When the plate and carriage reach the end of their travel, they, and the spring motor, will be brought to a stop. However, because the flywheel is coupled through the over-running clutch, it is free to continue rotating, dissipating its kinetic energy through friction.

It will also be apparent that when plate 3 and carriage 9 are moving to the right, the flywheel 25 is effectively disengaged by the over-running clutch, so that the mass of the flywheel is not involved since it does not rotate under these conditions.

Considering the effects of the present invention in terms of energy and momentum relations, consider the relation:

1. $Es = \frac{1}{2}(m + M)v^2$ where $Es$ is the fixed energy provided to the moving masses by the spring motor in its return travel and $m$ = Mass of sliding plate, carriage and equivalent mass of spring motor $M$ = Equivalent mass of the flywheel $v$ = Velocity when plate and carriage come to a stop Solving for $v$:

2. $v = \sqrt{2Es/m + M}$

Because of the one-way clutch, when the plate, carriage and motor come to rest, the flywheel continues to rotate. Therefore the document deck or the guide plate 1, as the case may be, must only stop the momentum of plate 3, carriage 9 and motor 19. This momentum is:

3. $mv = m \sqrt{2Es/m + M} = \sqrt{2Es} \sqrt{m/1 + M/m} = Q$

The impact force decreases as this momentum decreases. Therefore the addition of mass $M$ reduces the impact force, since if $M = 0$, the impact momentum is:

4. $mv = m \sqrt{2Es/m} = \sqrt{2Es} \sqrt{m} = Q_o$

On the other hand, if the flywheel mass $M$ is solidly coupled to the system (without the clutch), then the impact momentum is:

5. $(M + m)v = (M + m) \sqrt{2Es/m + M} = \sqrt{2Es} \sqrt{(m + M)} = Q_f$

It can be seen that $Q$ is less than $Q_o$ or $Q_f$, and accordingly the resulting impact force is smaller.

This invention can be readily employed in many instances in which rotary motion, or motion which can be converted to rotary, is to be retarded or damped.

While the invention has been particularly shown and described with reference to a preferred embodiment thereof, it will be understood by those skilled in the art that various changes in form and details may be made therein without departing from the spirit and scope of the invention.

I claim:

1. Mechanical motion retarding means comprising, in combination, a mechanical load device whose motion is to be retarded when moving in a first direction, an inertia element having a relatively large effective mass compared to the effective mass of said load device, and a unidirectional coupling means for operatively connecting said inertia element to be driven by said load device for a predetermined portion of its travel in said first direction and for operatively disconnecting said inertia element from said load device when said load device is travelling in the direction opposite to said first direction.

2. Mechanical motion retarding means as claimed in claim 1, in which said inertia element is a mass arranged to travel in a path substantially parallel to the path of said device.

3. Mechanical motion retarding means as claimed in claim 1, in which said coupling means comprises means fixedly attached to said load device and arranged to impel said inertia element as said load device moves in said given direction.

4. Mechanical motion retarding means as claimed in claim 1, in which energy dissipating means is provided to absorb the excess kinetic energy of said inertia element at the end of its travel.

5. Mechanical motion retarding means for retarding moving parts undergoing motion in a first direction, comprising, in combination, a flywheel having a relatively large mass compared to the mass of the moving parts to be retarded, a shaft arranged to be rotationally driven by the motion of the parts to be retarded, and an over-running clutch means coupling said flywheel and said shaft and arranged to couple said flywheel to be driven by said shaft when the shaft is being rotated by motion of said parts in said first direction to be retarded, and to decouple said flywheel from said shaft when said shaft is rotated by the motion of said parts in the direction of motion opposite to that to be retarded.

6. Mechanical motion retarding means as claimed in claim 5, in which said shaft is driven by a mechanical load to be damped, which has a rectilinear motion.

7. Mechanical motion damping means as claimed in claim 5, in which said shaft is coupled to both said load and power means for driving said load.

8. Mechanical motion retarding means as claimed in claim 5, in which said shaft is driven by a rotary spring motor coupled to a sliding member by a cable.

9. Mechanical motion retarding means as claimed in claim 8, in which said sliding member is a document pressure plate in a document stacker.

* * * * *